(12) United States Patent
Kumpf

(10) Patent No.: US 6,502,128 B1
(45) Date of Patent: Dec. 31, 2002

(54) SERVER AND A METHOD FOR COMMUNICATING EVENT MESSAGES FROM THE SERVER CONNECTED TO A PERIPHERAL DEVICE AND A CLIENT COMPUTER

(75) Inventor: David A. Kumpf, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/411,699

(22) Filed: Oct. 1, 1999

(51) Int. Cl.[7] .............................................. G06F 15/177
(52) U.S. Cl. ....................... 709/221; 709/220; 709/203; 710/15; 710/17
(58) Field of Search ...................... 710/19, 17

(56) References Cited

U.S. PATENT DOCUMENTS

| | | | |
|---|---|---|---|
| 3,633,178 A | * 1/1972 | Zopf | 358/1.1 |
| 5,220,674 A | * 6/1993 | Morgan et al. | 358/1.11 |
| 5,687,320 A | * 11/1997 | Wiley et al. | 707/10 |
| 5,887,146 A | * 3/1999 | Baxter et al. | 709/400 |
| 6,038,309 A | * 3/2000 | Ram et al. | 379/201.02 |
| 6,212,590 B1 | * 4/2001 | Melo et al. | 710/107 |
| 6,237,032 B1 | * 5/2001 | Scoville et al. | 709/220 |

* cited by examiner

*Primary Examiner*—David Wiley
*Assistant Examiner*—Phuoc M Nguyen

(57) ABSTRACT

A method and system for communicating an event message from a server connected to at least one peripheral device and at least one client via a network between a peripheral device and at least one client operably connected via a network. The method includes the server sending a message to any available peripheral device, responding to an event message from at least one peripheral device, responding to an acknowledgment message from at least one client, and responding to an expired timeout.

10 Claims, 6 Drawing Sheets

SERVER AND A METHOD FOR COMMUNICATING EVENT MESSAGES FROM THE SERVER CONNECTED TO A PERIPHERAL DEVICE AND A CLIENT COMPUTER

The present invention generally relates to a server and a method for communicating an event message from the server connected to at least one peripheral device and at least one client via a network, and more particularly to a method for the server to respond to events from the peripheral device or the client computer.

Networks commonly contain peripheral devices, such as a printer and/or a scanner connected to the network. This arrangement allows a number of client computers attached to the network to share the services of the network printer and/or the scanner. A multifunction peripheral (MFP) may combine the functions of these peripherals into a single peripheral. These MFPs may also be connected to a network peripheral server. Because the MFP does not know about the network since that information is localized to the server, the server must relay the messages sent by the MFP to the correct network host in an efficient, timely and reliable manner. Typical events might include a user initiating a scan by the peripheral or delivering a received fax. It is important for the server to be able to relay the message to the correct host.

One problem the server faces is that event messages must be relayed only to the intended host(s) and no others. After receiving an event message, the server needs a way to identify the intended host(s) and be able to send that particular event message to that host(s).

Another problem is that since network communications are inherently unreliable, the messages are not always received. The messages can get lost and not recovered.

Still another problem arises when the server services more than one peripheral, because a peripheral does not know about the existence of other peripherals connected to the same server, and cannot distinguish itself from other peripherals when it communicates with the server.

One prior method involved a frequent polling of the peripheral for event status by all the network hosts. However, in order to provide timely responses, the poll requests had to be sent frequently to check for an event that occurs infrequently. As a result of the frequent polling for an infrequent event, network bandwidth was inefficiently used, which resulted in other communication on the network taking longer. In other words, it slowed down the functioning of the network hosts.

Another method involved using the Simple Network Management Protocol (SNMP) trap protocol to send events, but this protocol did not provide any means for detecting and recovering lost messages. This created the problem of losing the event before the finished execution since the event messages were never received.

Still another method involved the server broadcasting events to all the hosts connected to the network. The method was inefficient since it required some of the hosts to receive events that did not apply to them. Furthermore, it was insecure and unreliable because network communications are inherently unreliable.

Accordingly, it is an object of the present invention to provide an improved method for a server to relay an event message only to the intended host(s) on a network.

It is a further object of the present invention to provide an improved method for achieving more reliable network communications of event messages.

Another object of the present invention is to provide an improved method for a server to achieving more efficient communications of event messages when servicing more than one peripheral device.

BRIEF SUMMARY OF THE INVENTION

The present invention provides a server and a method for communicating an event message from the server connected to at least one peripheral device and at least one client via a network, and more particularly to a method for the server to respond to events from the peripheral device or the client computer. The server is entirely event driven.

In accordance with this invention, the server can send a message to any available peripheral, respond to an event message from a peripheral, respond to an acknowledgment message from a client and respond to an expired timeout.

Other objects, features and advantages will become apparent upon reading the following detailed description, in conjunction with the attached drawings, in which.

DETAILED DESCRIPTION OF THE INVENTION

Broadly stated, the present invention is directed to a server and a method and system for communicating an event message from the server connected to at least one peripheral device and at least one client via a network. The server is adapted to send a message to the peripheral once it becomes available. Furthermore, the server is adapted to respond to an event message from a peripheral and an acknowledgment message from a client. Lastly, the server is adapted to respond to an expired timeout.

Figure 1:
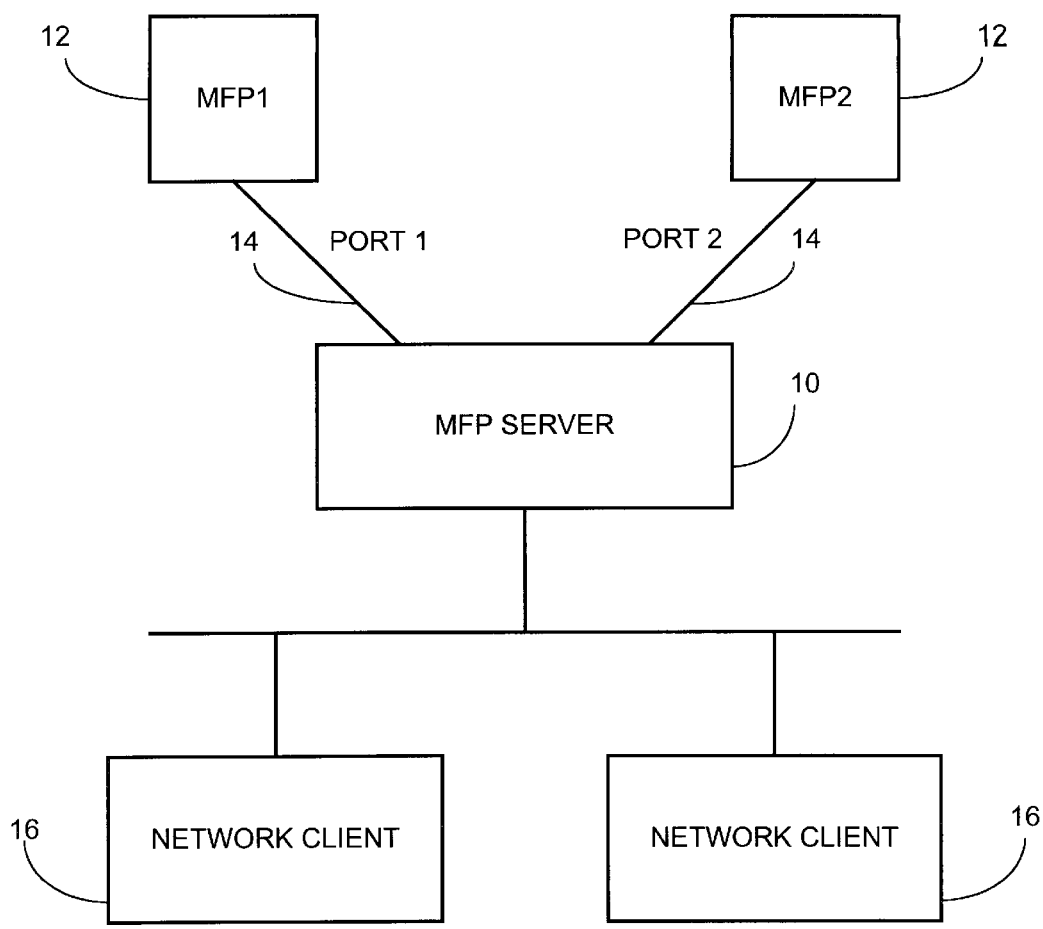
FIG. 1 is a schematic diagram of a network system in which the present method may be applied.

Turning now to FIG. 1, a schematic diagram of an exemplary network system is shown, and illustrating one way that the network system may be connected for the implementation of the present invention. In this instant example case, a plurality of peripheral devices (two shown), such as multifunction peripherals (MFPs) 12, may be connected to a peripheral network server (MFP SERVER) 10 having ports 14. The MFP SERVER 10 may be further connected to a plurality of client computers (clients) 16, two of which are shown. The client computers can be personal computers (PCs) or other types of computers.

Figure 2:
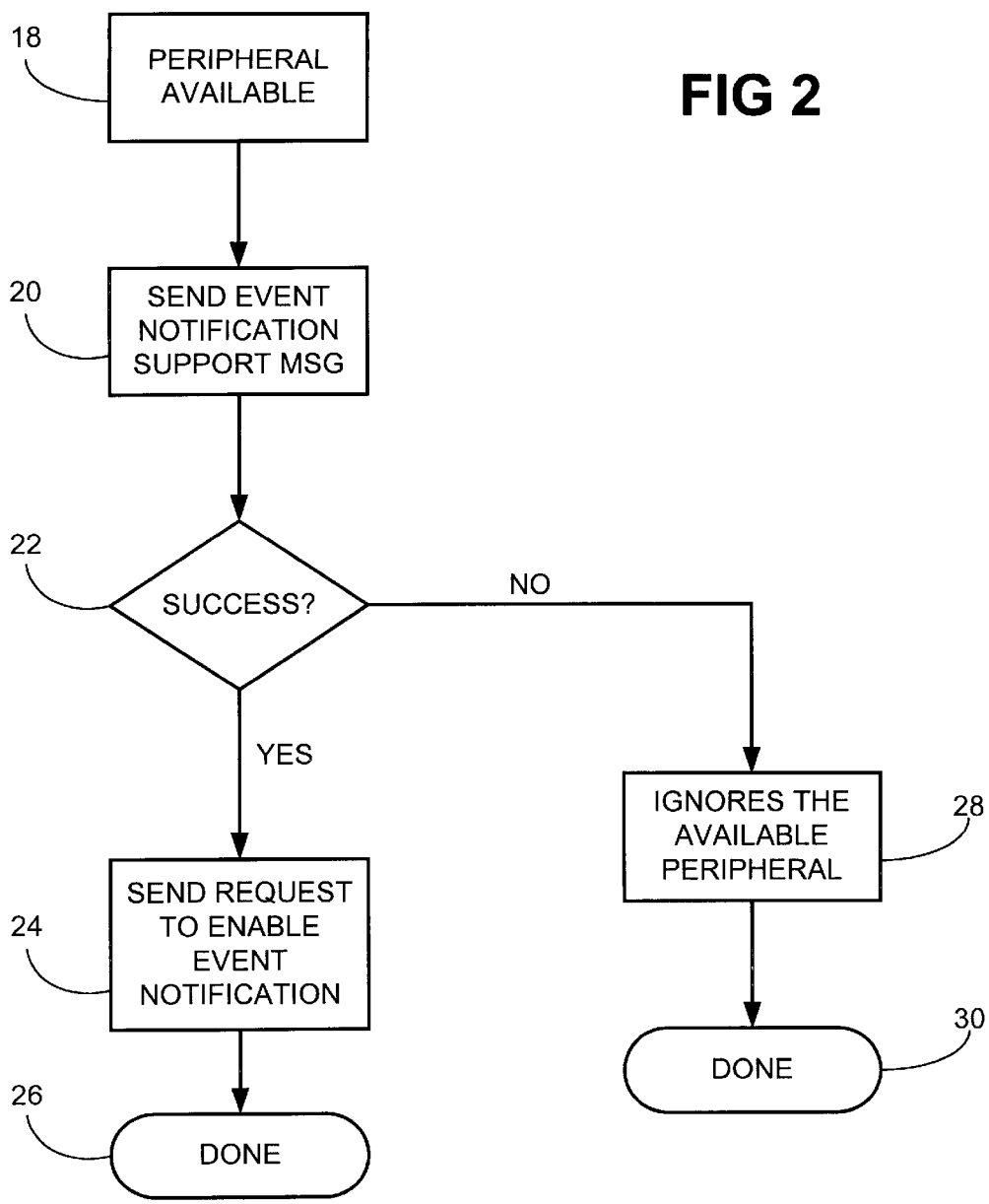
FIG. 2 is a flowchart illustrating the method for sending a message to any available peripheral device step of the present invention.

FIG. 2 shows the steps involved in which the MFP SERVER 10 sends a message to an available MFP 12. A MFP 12 becomes available when a communication link is established between the MFP SERVER 10 and the MFP 12. Generally, this happens shortly after both devices are powered up. However, communications can also be reestablished if the communication link is a cable that is disconnected and reconnected. In this case, the MFP SERVER 10 sends the MFP 12 a message again once the cable is reconnected, and the communication is reestablished. Once a MFP 12 becomes available (block 18), the MFP SERVER 10 sends an event notification support message to the available MFP 12 (block 20).

The purpose of the event notification support message is to test whether the MFP 12 supports the event notification method. This is necessary because some peripherals do not support the event notification method or the request to enable event notification. In fact, a request to enable event notification can cause the peripheral's embedded software (a.k.a. firmware) to fail. To avoid such failure, the MFP SERVER 10 must first determine if the MFP 12 supports the request to enable event notification since it must operate with all these peripherals. For example, when an event notification is done using the Peripheral Management Language (PML) trap protocol, the MFP SERVER 10 would first send a PML GET request for an event notification PML object.

When the MFP SERVER 10 receives a reply from the MFP 12 to the event notification support message, the MFP SERVER 10 checks the reply to see if a request to enable the event method would be successful (block 22). If so, the MFP SERVER 10 then sends a request to enable the event notification method (block 24), and the subroutine is completed (block 26). In the above example using the a PML trap protocol, if the reply from the MFP 12 indicates that the object exists, the MFP SERVER 10 then sends a PML TRAP-ENABLE request for that object. However, if the reply indicates that the MFP 12 does not support such a method, the MFP SERVER 10 ignores the available MFP 12 (block 28). The subroutine is then completed, and no further actions are taken by the MFP SERVER 10 (block 30).

Figure 3:
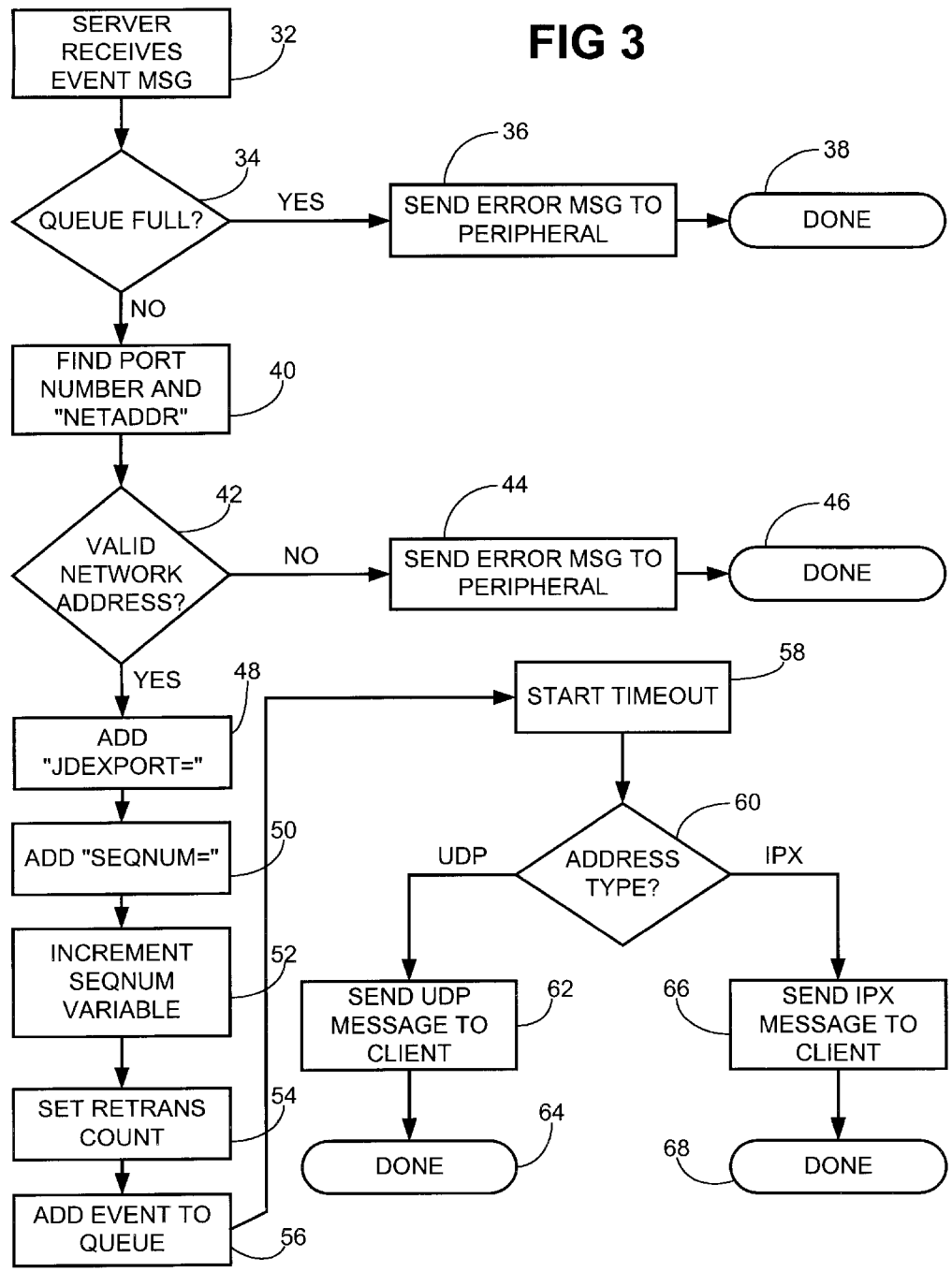
FIG. 3 is a flowchart illustrating the method for responding to an event message from at least one peripheral device step of the present invention.
Figure 4:
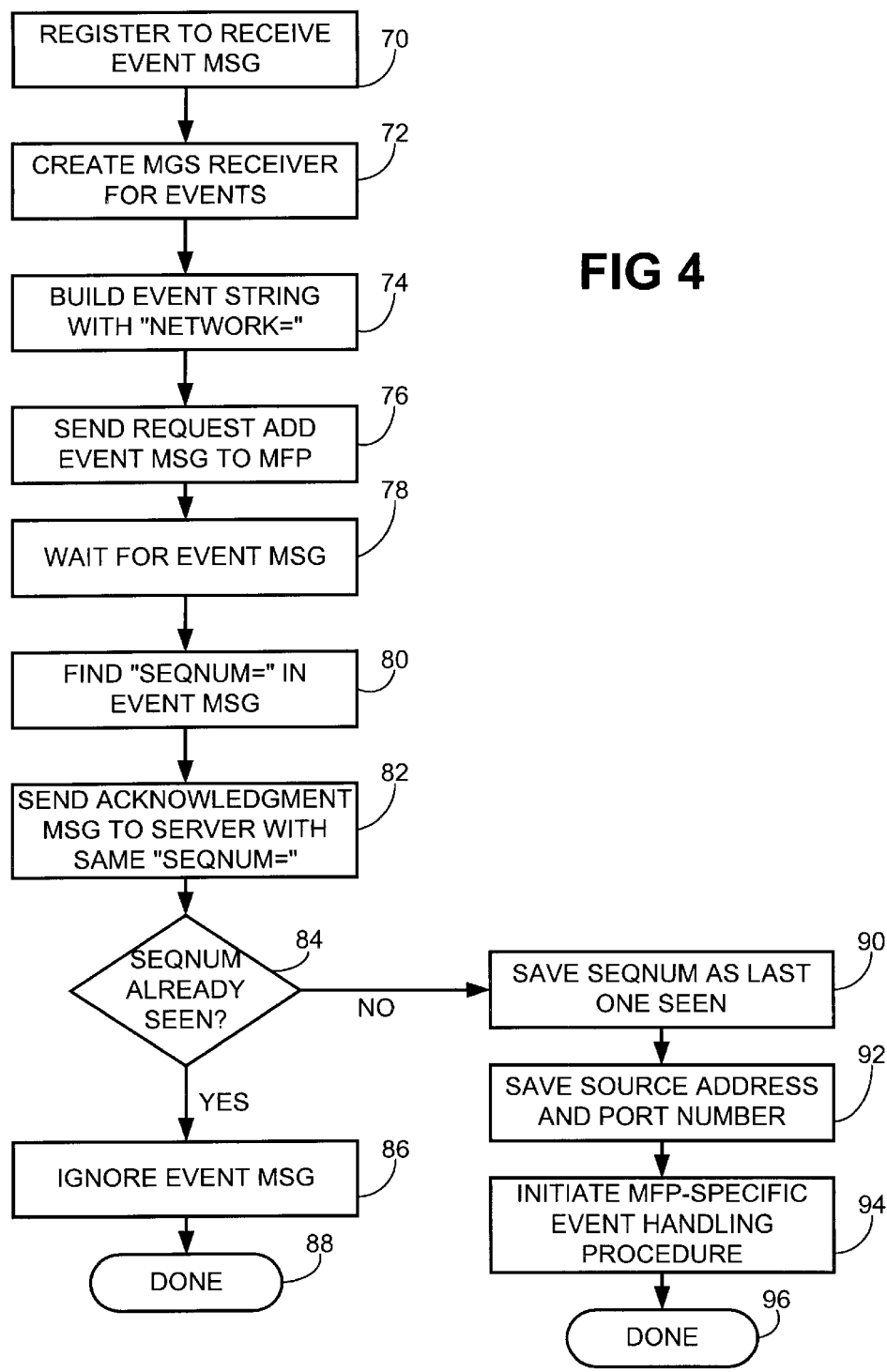
FIG. 4 is a flowchart illustrating the method for the client process steps of the present invention.

There are other steps that should take place before the step of responding to an event message from a peripheral device described in FIG. 3. The MFP SERVER 10 must first enable the client 16 to send an add-event message to the MFP 12 across the network. Using the PML trap protocol to send PML messages over a network, the preferred approach is for the client 16 to translate the PML messages into SNMP messages and send them back to the MFP SERVER 10 using the SNMP protocol. The MFP SERVER 10 translates these SNMP messages back to PML and sends them to the MFP 12. FIG. 4 describes the method for the client process steps of the present invention. Continuing with the prior steps, each client 16 next has to register itself to receive event messages (block 70). Each client 16 creates a network event message receiver or "socket" for events (block 72). The socket defines the network address.

After the client 16 adds the network address where the event messages should be sent in the "NETADDR=addr" parameter contained within a request add event message (block 74), this message is then sent to the MFP 12 (block 76). The client then waits for event messages (block 78). The format of the address in the "NETADDR=addr" parameter depends on the network transport used. For example, the format of the User Datagram Protocol (UDP) transport is "IP-address:UPD-port". Then, the parameter may read, for example, "NETADDR=15.29.40.28:8000". On the other hand, the format for the Internetwork Packet Exchange (IPX) transport is "net-number:host-address:socket-number". As an example, the parameter may read "NETADDR=0000c200:0060b0c6ec82:8000". If the format is ambiguous, meaning different transports might use the same format, the address may be prefixed with a transport name, such as "NETADDR=UDP:15.29.40.28:8000" or "NETADDR=IPX:000c200:0060b0c6ec82:8000". The two network transports used here, UDP and IPX, are the most common, but other network transports can also be supported by the present invention. Datagram oriented transports are preferred because they use minimal system resources and keep each message separate from others.

In accordance with another aspect of the present invention, FIG. 3 shows the method for responding to an event message from at least one peripheral device step of the present invention. The MFP SERVER 10 receives an event message from at least one peripheral device (block 32). Next, the MFP SERVER 10 checks to see if the pending acknowledgment queue is full (block 34). If the queue is full, the MFP SERVER 10 sends an error message to the MFP 12 (block 36), and finishes the subroutine (block 38). The MFP 12 should again send this same event message to the MFP SERVER 10 after waiting for a brief period (half a second to one second). On the other hand, if the queue is not full, the MFP SERVER 10 locates the port number indicated by port 14 which connects the MFP 12 to the MFP SERVER 10 (block 40).

The MFP SERVER 10 further locates the network address in the "NETADDR=addr" parameter contained within the event message string (block 40). The MFP SERVER 10 determines if a valid network address was given (block 42), and again sends an error message to the MFP 12 if an invalid network address is found (block 44), and ends the subroutine (block 46). If a valid network address is found, the MFP SERVER 10 first adds a "JDEXPORT=num" parameter to uniquely identify the MFP 12 (block 48). Although the "JDEXPORT=num" parameter was implemented for MFP SERVER 10 capable of supporting more than one MFP 12, it should be understood that servers that only support one peripheral device may also be used and are within the scope of the present invention.

With that in mind, for the MFP SERVERs 10 that are capable of serving multiple MFPs 12 using a single network address, the client 16 needs to know which of those MFPs 12 originated the event. Thus, when the MFP SERVER 10 receives an event string from a MFP 12, the MFP SERVER 10 notes which port number the event string arrived on and places the number in the "JDEXPORT=" parameter. The client 16 can use this information for whatever actions it takes as a result of the event, such as initiating a scan or a fax upload.

The MFP SERVER 10 also adds a "SEQNUM=num" parameter to the event string (block 50). Then, the sequence number variable is incremented for the next event message (block 52). The sequence number is incremented for each event in order for each event to have a unique identifier. This sequence number is used later when the network client acknowledges the event. Next, the MFP SERVER 10 sets the retransmission count for the event (block 54). A total of four retransmissions is the preferred embodiment because it allows for an occasional lost packet due to other network traffic while it does not keep retransmitting past what a typical user would consider a timely response.

The MFP SERVER 10 then adds the event to the pending-acknowledgment queue (block 56) and start a timeout (block 58), preferably one second duration. Finally, the MFP SERVER 10 sends the augmented string to the network address found earlier in the "NETADDR=" parameter. If the MFP SERVER 10 supports multiple transport protocols, it determines the type of address (block 60) from the "NETADDR=addr" located earlier in the event message, and sends the augmented event message using the correct transport to the client. For example, if a UDP transport is used, an UDP message would be sent (block 62), concluding the subroutine (block 64). Similarly, an IPX message would be sent if an IPX protocol is used as a transport (block 66) which ends the subroutine (block 68). Once again, the UDP and IPX network transports were used as an example because they are most commonly used. However, it should be understood that other network transports may be used and are within the scope of the present invention.

In accordance with yet another aspect of the present invention, the method for the client process steps of the present invention is shown in FIG. 4. The client 16 waits for the event message from the MFP SERVER 10 (block 78). After receiving the event message from the MFP SERVER 10, the client 16 first locates the sequence number in the "SEQNUM=num" parameter contained in the event message string (block 80). The client 16 sends an acknowledgment message with a string containing the same sequence number back to the MFP SERVER 10 (block 82). Next, the client 16 determines if this sequence number has already been received by checking if the sequence number is greater than the last sequence number received (block 84). If the client 16 determines that the sequence number has already been received, the client 16 ignores the event message since the event is a duplicate (block 86). No further action is taken by the client 16, and the subroutine is finished (block 88). However, if the client 16 determines that the sequence number is greater than the last sequence number received, the client 16 updates the last sequence number seen (block 90). Then the client 16 saves the network address of the MFP SERVER 10 that sent the message and the port number found in the "JDEXPORT=" parameter (block 92), and initiates the peripheral-specific event handling procedure (block 94). After the initiation, the subroutine comes to a conclusion (block 96).

Figure 5:
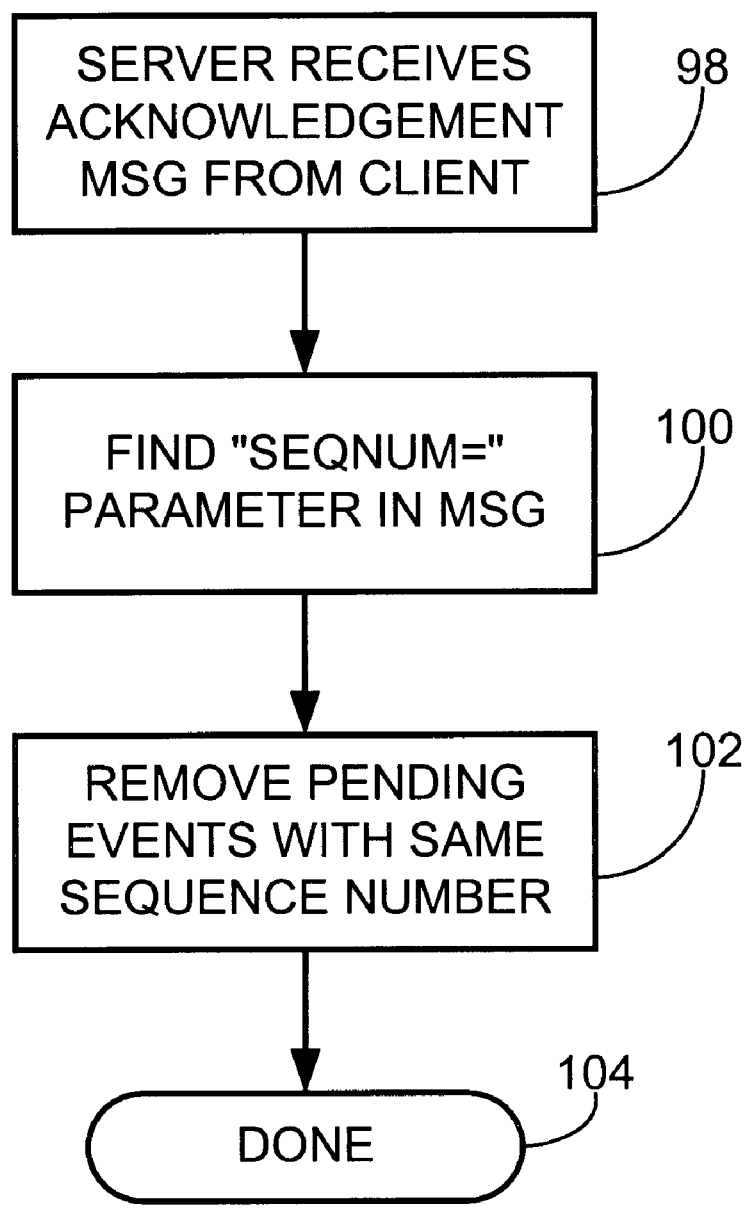
FIG. 5 is a flowchart illustrating the method for responding to an acknowledgment message from at least one client step of the present invention.

The method for responding to an acknowledgment message from at least one client step of the present invention is shown in FIG. 5. After the MFP SERVER 10 receives the earlier mentioned acknowledge message from the client 16 (block 98), it locates the "SEQNUM=" parameter in the acknowledgment message (block 100). The MFP SERVER 10 then removes all the events in the pending-acknowledgment queue that have the same sequence number (block 102), and the subroutine is concluded (block 104).

Figure 6:
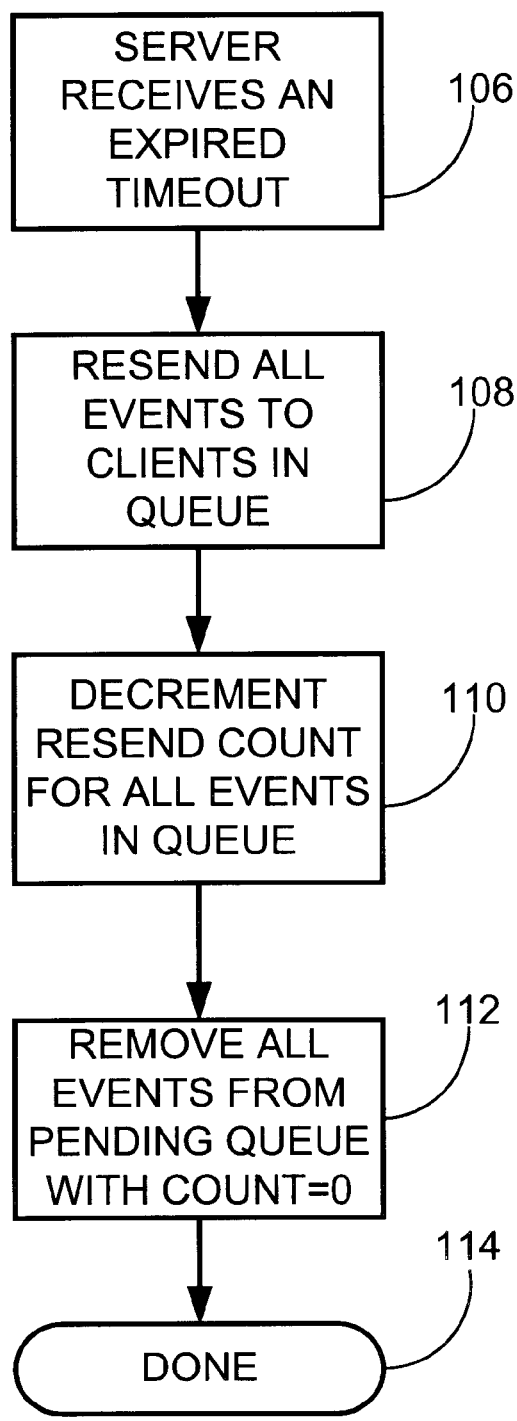
FIG. 6 is a flowchart illustrating the method for responding to an expired timeout.

Finally, the method for responding to an expired timeout is described in connection with FIG. 6. It is generally known that networks and datagram transports are often unreliable. If either the event message or the acknowledgment message is lost in transmission, the timeout would eventually expire. When this happens, the MFP SERVER 10 receives an expired timeout (block 106). The MFP SERVER 10 then resends each event in the pending-acknowledgment queue (block 108). Next, the server decrements the resend count of each event in the queue (block 110). Finally, the server removes all events in the queue whose resend count has reached zero (block 112) and the subroutine is concluded (block 114).

From the foregoing description, it should be understood that an improved method for communicating an event message from a server connected to at least one peripheral device and at least one client via a network has been shown and described which has many desirable attributes and advantages. The method adapts the server to provide event notification to client computers that communicate with the peripheral devices over a network.

While various embodiments of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for communicating an event message from a server operably connected to at least one peripheral device and to at least one client via a network, the method comprising the steps of:

the server sending a message to any available peripheral device;

the server receiving an event message from at least one peripheral device;

the server sending an error message to at least one peripheral device if a pending-acknowledgment queue is full;

the server locating a port number and a network address in a "NETADDR=addr" parameter contained within the event message string if a pending-acknowledgment queue is not full;

the server responding to an acknowledgment message from at least one client; and, the server responding to an expired timeout.

2. The method according to claim 1 wherein prior to said step of the server receiving an event message from the at least one peripheral device, further comprising the steps of:

the server enabling the client to send an add-event message to the peripheral devices via the network;

the client registering to receive event messages;

the client creating a network event message receiver;

the client adding a network address where event messages should be sent in a "NETADDR=addr" parameter contained within a request add event message; and, the client sending a request add event message to at least one peripheral device.

3. The method according to claim 1 wherein said step of the server sending a message to any available at least one peripheral device further comprising the steps of:

the server sending an event notification support message for verification of at least one peripheral device supporting an event notification message;

the server sending a request to enable event notification messages if the peripheral device accepts the event notification support message; and the server ignoring the available peripheral device if the peripheral device does not accept the event notification support message.

4. The method according to claim 1 wherein said step of locating a port number and a network address in a "NETADDR=addr" parameter contained within the event message string further comprises the steps of:

adding the port number for the specified at least one peripheral device in a "JDEXPORT=num" parameter contained within the event message string for uniquely identifying each peripheral if the network address is valid; and, sending an error message to at least one peripheral device if the network address is invalid.

5. The method according to claim 4 wherein said step of adding the port number further comprises the steps of:

adding a sequence number that is incremented for each event message in a "SEQNUM=num" parameter contained within the event message string for uniquely identifying each event message;

incrementing the sequence number variable for a next event message;

setting a retransmission count for the event message;

adding the event message to the pending-acknowledgment queue;

starting a timeout;

identifying the type of network address in the "NETADDR=addr" parameter contained within the event message string if the server supports multiple transport protocols;

sending the event message with the augmented string to the designated at least one client according to the network address in the "NETADDR=addr" parameter contained within the event message string using the transport protocols identified; and, the client responding to an event message from the server.

6. The method according to claim 5 further comprising the steps of:

locating a sequence number in the "SEQNUM=num" parameter contained within the event message string;

sending a acknowledgement message with the located sequence number back to the server;

updating a last sequence number when the sequence number in the "SEQNUM=num" parameter contained within the event message string is greater than the last sequence number received; and, ignoring the event message when the sequence number in the "SEQNUM=num" parameter contained within the event message string is not greater than the last sequence number received.

7. The method according to claim 6 wherein said step of updating a last sequence number further includes the steps of:

saving the network address of the server that sent the message and the port number specified in the "JDEXPORT=num" parameter contained within the event message string; and, initiating the peripheral-specific event handling procedure using the network address and the port number.

8. The method according to claim 1 wherein said step of the server responding to an acknowledgment message further comprises the steps of:

locating the sequence number in a "SEQNUM=num" parameter contained within the acknowledgment message string; and, removing all events in the pending-acknowledgment queue with the located sequence number.

9. The method according to claim 1, wherein said step of the server responding to an expired timeout further comprises the steps of:

resending all event messages in the pending-acknowledgment queue;

decrementing the resend count for all event messages in the pending-acknowledgment queue; and, removing all event messages with the resend count equal zero from the pending acknowledgment queue.

10. A server for communicating event messages to at least one peripheral device and to at least one client via a network, said server comprising:

means for sending a message to any available peripheral device;

means for receiving an event message from at least one peripheral device;

means for sending an error message to at least one peripheral device if a pending-acknowledgment queue is full;

means for locating a port number and a network address in the "NETADDR=addr" parameter contained within the event message string if a pending-acknowledgment queue is not full;

means for responding to an acknowledgment message from at least one client; and, means for responding to an expired timeout.

* * * * *